United States Patent [19]

Neeff

[11] 4,106,328

[45] Aug. 15, 1978

[54] PORTABLE PROVER BARREL

[76] Inventor: Harry B. Neeff, 1530 E. "C" St., Casper, Wyo. 82602

[21] Appl. No.: 834,334

[22] Filed: Oct. 6, 1977

[51] Int. Cl.² ............................................... G01F 25/00
[52] U.S. Cl. ........................................ 73/3; 280/404; 280/433; 280/763
[58] Field of Search ............................................... 73/3

[56] References Cited

U.S. PATENT DOCUMENTS

| | | | |
|---|---|---|---|
| 2,792,705 | 5/1957 | Barrett, Jr. | 73/3 |
| 3,295,357 | 1/1967 | Halpine | 73/3 |
| 3,446,055 | 5/1969 | Tuck et al. | 73/3 |

Primary Examiner—S. Clement Swisher
Attorney, Agent, or Firm—Burton & Dorr

[57] ABSTRACT

A portable prover barrel apparatus having a lower section with left and right tubes arranged horizontal and parallel to each other and terminating in vertical upstanding tubular rear ends and in vertical upstanding tubular connectors at the front ends, a wheel assembly connected to the lower section, an upper section with left and right tubes arranged horizontal and parallel to each other and terminating at the rearward ends in downwardly extending vertical tubular connectors, a U-shaped tubular portion operatively interconnected with the forward ends of the upper section's left and right tubes, a fifth wheel female assembly mounted to the upper section left and right tubes near the U-shaped portion, leveling jacks connected at the juncture between the upper and lower sections, and a housing compartment mounted on the lower section above the tubes and oriented behind the upper section.

10 Claims, 9 Drawing Figures

Fig-1

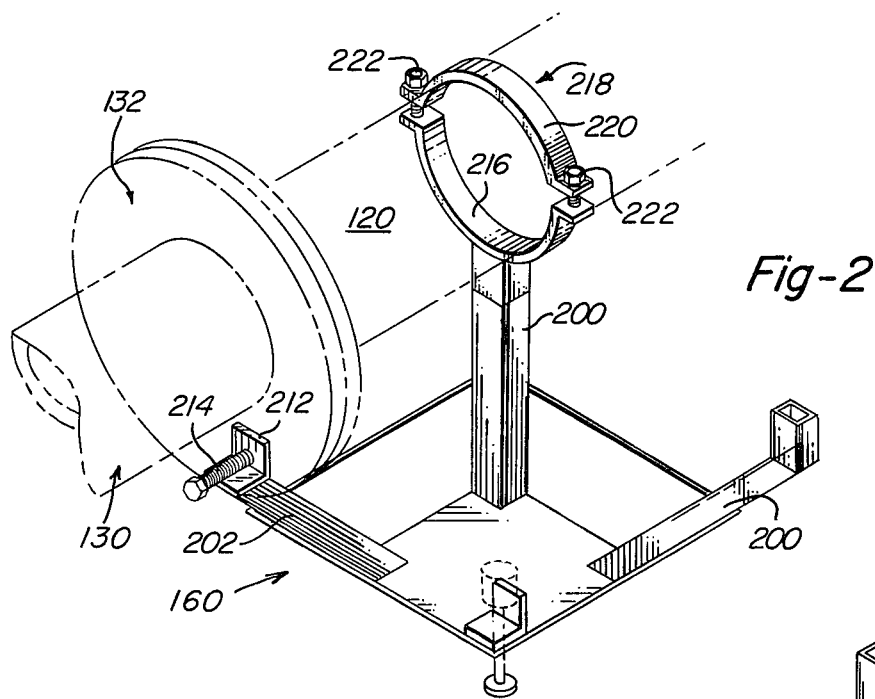
Fig-2
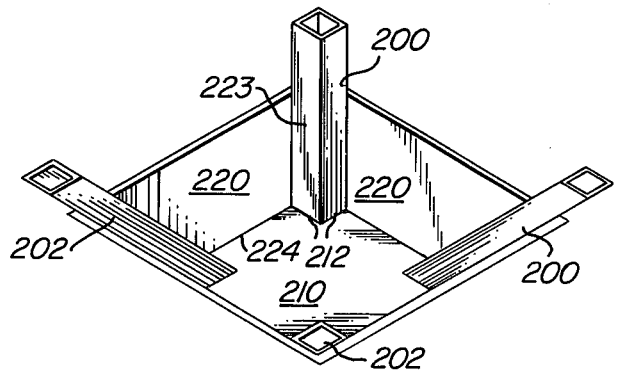
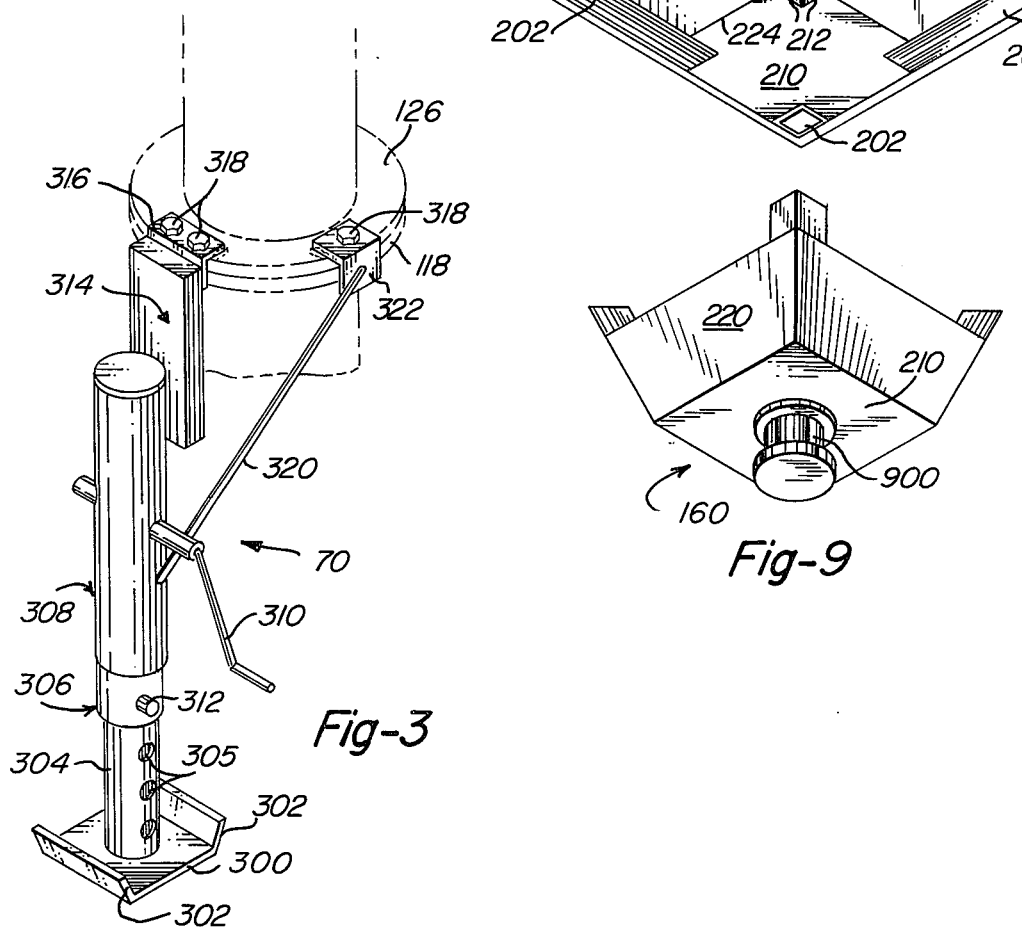
Fig-9
Fig-3

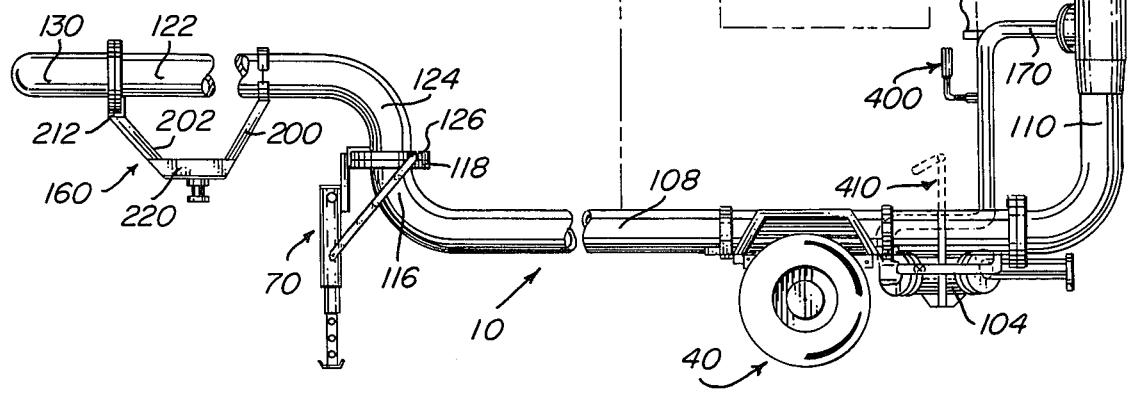
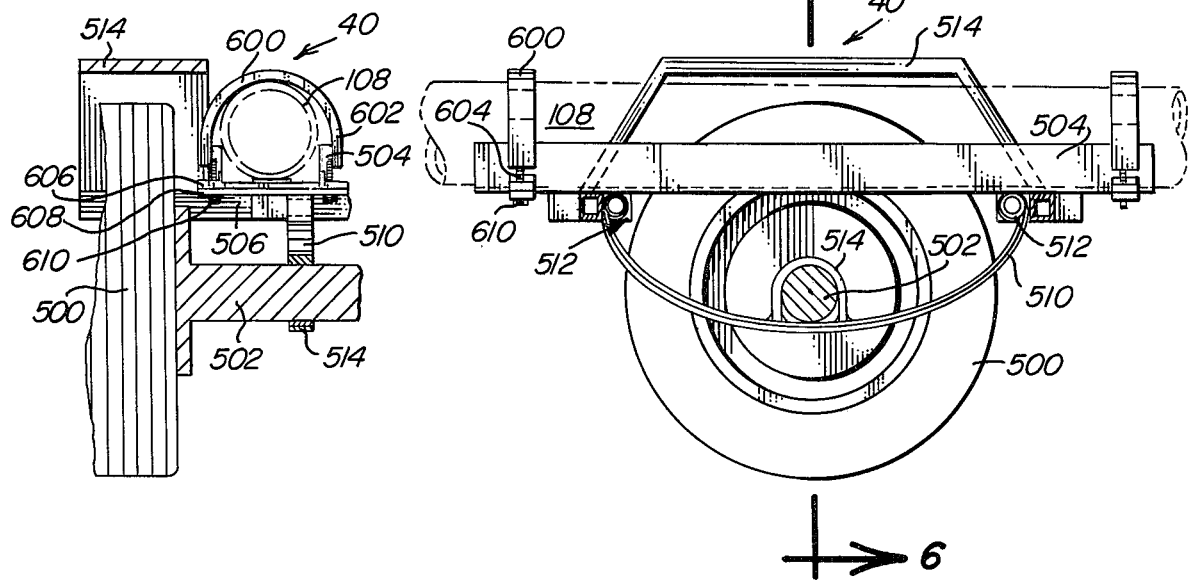

PORTABLE PROVER BARREL

BACKGROUND OF THE INVENTION

1. Field of the Invention

This invention relates to prover barrels used in the oil industry for determining the accuracy of flow meters, and more particularly to portable prover barrels.

2. Discussion of the Prior Art

Meters are extensively used in the oil and gas industry to determine flow in order to protect the rights, not only of the seller, but also the buyer of the product flowing through the meters. It is not surprising, therefore, that not only do these meters have to be highly accurate, but they must be "proved" accurate on a regular basis subject to federal and state regulation when dealing with public or on state or federal leases. Prover barrels are extensively used as the instrument to systematically determine the accuracy of such meters. Prover barrels, in turn, must be highly accurate instruments and are checked for accuracy according to standards established by the National Bureau of Standards.

A typical prover barrel consists essentially of flanged, internally phenolic-coated tubular pipe. A series of switches are placed at predetermined locations in the pipe. When a product such as oil moves through the pipe, the oil pushes a sphere ahead of it. The sphere trips a first switch which activates a set of electronic counters, which receive a predetermined number of counts per barrel from the meter. When the sphere activates a second set of switches, the counter stops. Up to four switches can be utilized. The volume of oil between the switches has been previously determined according to measurements performed by standards of the National Bureau of Standards. On the basis of this "proven" volume (and the temperature of the product) the counter readings are utilized to determine the accuracy of the meter. The actual flow through the prover barrel is compared to the reading of the meter and a correction factor is determined. The correction factor is then utilized for every reading of the meter until the next accuracy test.

One example of prior art "prover barrels" that have a fixed situs at the location, are those manufactured by the Smith Meter Systems Division of Geosource, Inc., Erie, Pennsylvania 16512.

An example of a portable prover barrel which is mounted on the flatbed of a truck is that manufactured by Maintenance Mechanical Corp., 3711 Clinton Drive, Houston, Texas. The portable prover barrel is required to determine the accuracy of meters located in the field on a regular periodic basis. A major disadvantage with mounting a prover barrel on the flatbed of a truck is the large amount of "down time" encountered when the truck experiences a mechanical failure. In such cases, valuable contracts may be lost since it is mandatory that regular and systematic inspections of meters be made. Often times, such meters are located in very remote parts of the country where the availability of repair garages is at a minimum. The only feasible solution to this major disadvantage appears in duplicating "prover barrel" flatbed trucks. This alternative, however, is quite costly.

One approach in alleviating the down time of the portable prover barrel is the mounting of the prover barrel on a trailer and the use of a pickup truck or the like for pulling the trailer. If the pickup truck should experience a mechanical failure, the prover barrel can be selectively released therefrom and interconnected with another available pickup truck. This approach also experiences several inherent disadvantages. The trailer requires a heavy-duty bed to accommodate the prover barrel. Such a heavy trailer bed in combination with the weight of the prover barrel results in a considerable wear factor on the truck (increased repair) pulling it to the remote sites which are generally over extremely rough roads and a considerable operating cost in increased gas consumption. Therefore, while the trailer mounted prover barrel has the advantage over the flatbed mounted prover barrel of minimum down time, the flatbed approach offers the advantage of less operating cost and greater ease in arriving at the remote location.

The present invention seeks to obtain the flexibility of a trailer approach (i.e., minimizing the down time problem) and the low weight of the flatbed approach (i.e., minimum operating cost). This is accomplished, under the teachings of the present invention, by arranging the actual tubular elements of the prover barrel in a unique orientation and using the prover barrel itself as the structural components of a trailer. Under the teachings of the present invention, a wheel assembly is mounted to the prover barrel as well as a fifth wheel hook-up.

Another primary disadvantage of the prior art approaches, whether mounted on a flatbed or on a trailer, is the inconvenience of use. The inconvenience in using such prior art approaches becomes clear when it is realized that the proving of the meter must always be witnessed by at least two persons (often more) — one person represents the buyer of the product and one person represents the seller of the product. In addition to the witnesses, a technician must be on hand to operate the prover barrel. With all of the above portable prior art approaches, these persons experience dramatic environmental conditions since a minimum of five runs is generally necessary to prove the meter, consuming up to several hours at a time in locations that are very remote and at time periods which include the heat of the summer and the blizzard conditions of winter. With all current prior art approaches, the witnesses and the operating technician must operate the prover barrel in such adverse environmental conditions.

Under the teachings of the present invention, the environmental disadvantages are completely overcome by mounting a housing compartment onto the prover barrel. In essence, the prover barrel, under the teachings of the present invention, serves to act as a trailer bed carrying a housing compartment. All controls, thermometers, and other instrumentation are centrally located on the interior of the housing compartment. Prior art approaches simply do not provide for a central location for these components nor for a housing compartment.

As a result, the housing compartment of the present invention provides not only a more comfortable setting for proving and observing the proving of a meter, but a more profitable setting as well. The panel with all the instruments mounted centrally on the interior of the housing provides a greater degree of accuracy in that the instrumentation is protected from the elements. Furthermore, a greater degree of profitability for the owner of the prover barrel is experienced primarily because increased efficiency results in obtaining the readings, especially in adverse environmental conditions. Furthermore, because the technician is not overtired or over-cold from exposure to the elements, he does a better job for the client.

SUMMARY OF THE INVENTION

A portable prover barrel apparatus is disclosed in which the prover barrel is modified in shape in order to mount a wheel assembly on a lower portion and a fifth wheel male assembly on an upper portion so that the overall configuration resembles that of a trailer. A housing compartment can be optionally mounted on the rear section and behind the upper section and the controls and instrumentation can be arranged to be centrally disposed in the housing compartment.

In a preferred embodiment, the portable prover barrel apparatus includes a lower section with left and right tubes wherein each of the tubes is horizontal and parallel to each other and wherein each tube teminates in a vertical upstanding tubular rear end having bleeder and pressure relief valves. A wheel assembly is connected to the lower section's left and right tubes by means of opposing channels receptive of each tube so that a pair of hold-down straps can engage the periphery of the tube and the channel to firmly affix the tube to the axle of the wheel assembly. The front of the lower section's left and right tubes terminate in vertical upstanding tubular connectors. An upper section also having left and right tubes terminates at the rear end in a downwardly extending vertical connector which mates with the lower section's connectors. The upper section's left and right tubes are also horizontal and parallel to each and are interconnected by means of a U-shaped tubular portion. A fifth wheel female assembly is mounted by means of hold-down straps engaging the periphery of the upper section's tubes.

The optional housing compartment is mounted on the lower section's tubes and is designed to house three or more persons and the necessary controls and instrumentation for taking readings from the prover barrel.

OBJECTS OF THE INVENTION

It is an object of the present invention to provide a new and novel portable prover barrel which can be selectively interconnected with a plurality of different moving vehicles.

It is a further object of the present invention to provide a new and improved portable prover barrel apparatus that uses the prover barrel itself as the frame for interconnecting with the moving vehicle and for supporting a wheel assembly.

It is a further object of the present invention to provide a new and improved prover barrel apparatus having a mounted housing compartment with centrally located instrumentation and controls.

It is a further object of the present invention to provide a prover barrel apparatus having a lower section with left and right tubes wherein each of the tubes are horizontal and parallel to each other and wherein each tube terminates in a vertical upstanding tubular rear end and in a vertical upstanding tubular connector at the front end, a wheel assembly connected to the lower section, an upper section with left and right tubes wherein each of the tubes are horizontal and parallel to each other and wherein each tube terminates at the rearward end in a downwardly extending tubular connector which mates with the lower section's vertical upstanding tubular connector, a U-shaped tubular portion operatively interconnected with the forward ends of the upper section, and a fifth wheel male assembly mounted to the upper section near the U-shaped portion.

It is a further object of the present invention to provide a new and improved prover barrel apparatus having a lower section with left and right tubes wherein each of the tubes are horizontal and parallel to each other and wherein each tube terminates in a vertical upstanding tubular rear end and in a vertical upstanding tubular connector at the front end, a wheel assembly connected to the lower section, an upper section with left and right tubes wherein each of the tubes are horizontal and parallel to each other and wherein each of the tubes terminates at the rearward end in a downwardly extending tubular connector which mates with the lower section's vertical upstanding tubular connector, a U-shaped tubular portion operatively interconnected with the forward ends of the upper section, a fifth wheel male assembly mounted to the upper section near the U-shaped portion, a leveler interconnected at the joint between the upper and lower sections for leveling the prover barrel, and a housing compartment mounted on the lower section and behind the upper section.

Other objects, advantages and capabilities of the present invention will become more apparent as the description proceeds taken in conjunction with the accompanying drawings.

DESCRIPTION OF THE DRAWINGS

FIG. 1 is a perspective view of the portable prover barrel apparatus of the present invention detached from the moving vehicle and in leveled position.

FIG. 2 is a perspective view of the details of the fifth wheel female assembly mounted to the upper section of the prover barrel of the present invention.

FIG. 3 is a perspective view illustrating the details of the leveling jack of the present invention.

FIG. 4 is a side planar view of the prover barrel apparatus of the present invention.

FIG. 5 is a side planar view of the details of the wheel assembly as it is mounted onto the prover barrel of the present invention.

FIG. 6 is a cross-sectional view of the wheel assembly and mount shown in FIG. 5.

FIG. 9 is a perspective view of the fifth wheel and support.

DETAILED DESCRIPTION

Figure 1:
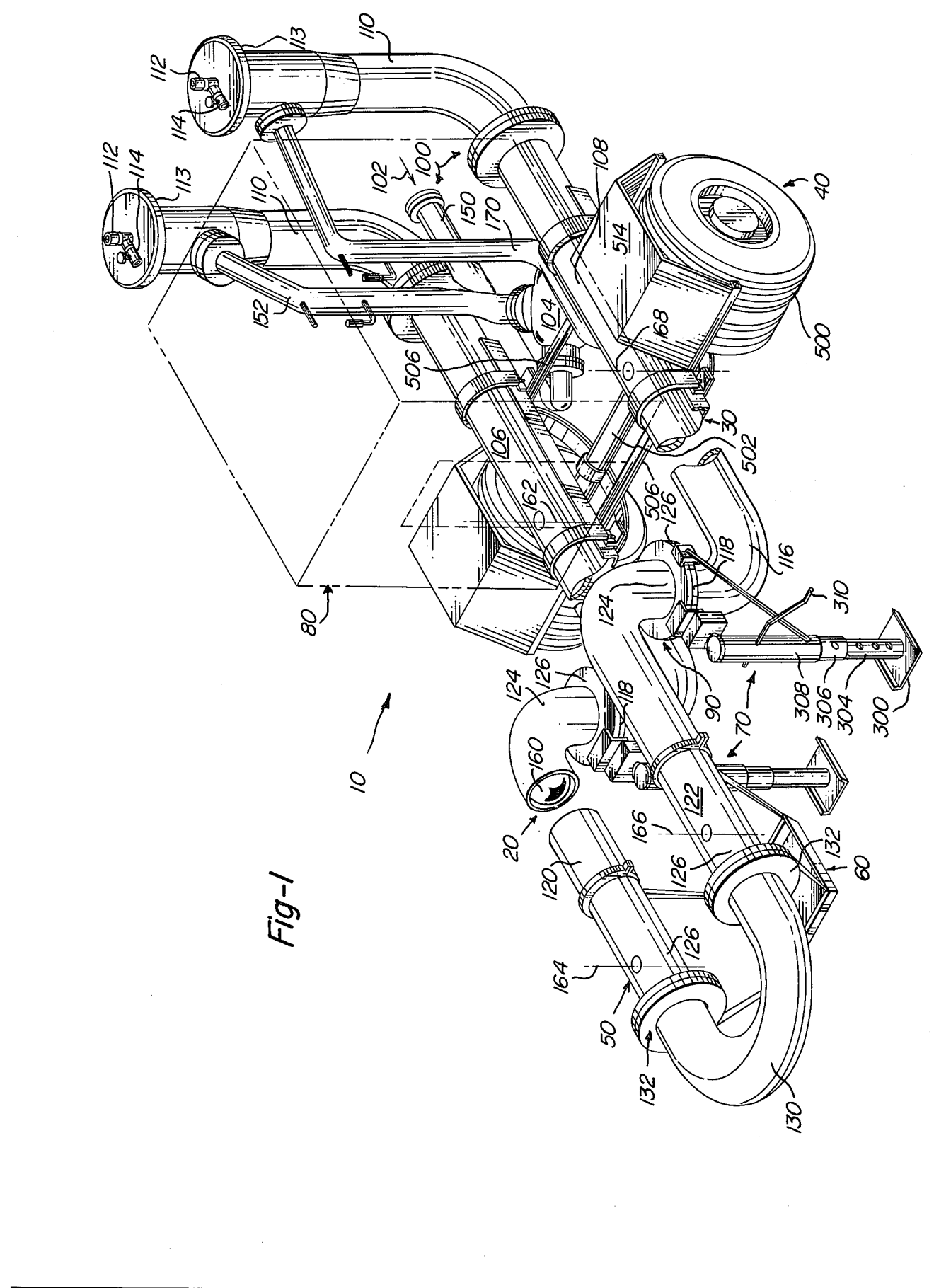
Figure 7:
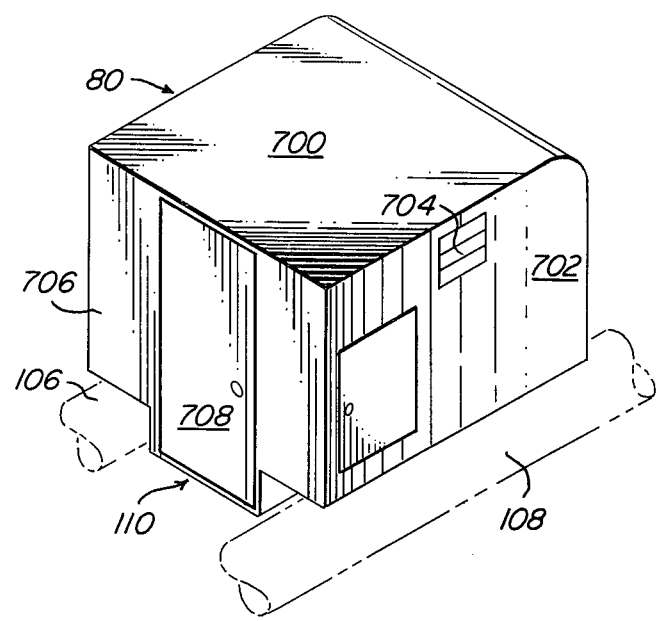
FIG. 7 is a perspective view of the housing of the present invention showing the rear door entry.

The portable prover barrel apparatus 10 of the present invention is shown in FIG. 1 to include the prover barrel 20, modified to include a lower section 30 mounted to a wheel assembly 40 and an upper section 50 having a downwardly extending fifth wheel male assembly 60. The portable prover barrel 10 of the present invention is shown dismounted from a vehicle (not shown) and having its upper section 50 supported by leveling jacks 70. As will be discussed in the ensuing, a housing compartment 80 can be optionally provided mounted on the lower section 30 directly behind the upper section 50.

The prover barrel is of conventional operation and in a conventional situation, the entire prover barrel is mounted onto a flatbed truck or mounted onto a separate trailer.

Under the teachings of this invention, the upper section 50 is reversed at connection point 90 to extend forwardly. But for this modification, the operation of the prover barrel 20 is standard and does not change under the teachings of this invention. Oil or product flows into the prover barrel 20 at one of the connection points 100 and out through the other connection point 100. Once the product which is designated by arrow 102 flows into the prover barrel 20, a four-way diverter valve 104 is utilized to divert the product 102 into the interior of the prover barrel 20. As shown, the prover barrel 20 includes a lower section 30 having a left tube 106 and a right tube 108. Each tube, 106 and 108, terminates in an upwardly extending vertical end 110. Ends 110 may be at any angle from horizontal to vertical. When ends 110 are substantially vertical, the length of the prover barrel 20 is substantially shortened and the sphere 160 can be recovered for inspection without draining the oil. Disposed on the extreme end of vertical ends 110 are pressure relief valves 112 and bleeder valves 114. The removable covers 113 are positioned above tubes 120-122 so that oil is not lost when the covers are opened. The front ends 116 of tubes 106 and 108 terminate in vertical upstanding tubular connectors 118.

The upper section 50 includes a left tube 120 and a right tube 122 which each terminate, at the rear end 124, in a downwardly extending vertical tubular connector 126. At the forward end 126 tubes 120 and 122 are interconnected with a U-shaped tubular portion 130 by means of circular flanges 132.

The upper section 50 is connected to the lower section 30 by means of circular flanges 126 and 118 in a conventional fashion (e.g., a plurality of bolts disposed around the periphery of flange with corresponding gaskets or the like). It is to be understood that the several connections of the tubular portions to each other by means of circular flange plates is conventional and well understood by those skilled in the art.

In operation, oil or product 102 enters the port 100 and is delivered through pipe 150 into the four-way valve 104. In the proper setting, the four-way valve will deliver the oil upwardly through tube 152 into end 110 of the left tube 106. The oil flows through tube 106 driving an internal ball or sphere 160 as it flows. It is to be understood that the ball 160 engages the interior surfaces of the tube 106 in a sealing relationship. As the oil flows in the tube 106, the ball 160 is driven ahead of the oil and activates a first switch 162. In a conventional fashion, the activation of switch 162 commences an electronic counter to start counting. The flow of the oil causes the ball 160 to continue to flow forward up end 116 through and into end 124 of the tube 120. It then activates a second switch 164 which causes the electronic counter to stop counting and to provide a reading that is proportional to the volume of oil between switches 162 and 164. The oil then pushes the ball through the U-shaped portion 130 into the right tube 122 to activate a third switch 166 which causes the counter to commence counting again. The oil then forces the ball rearwardly through tube 122 downwardly into tube 108 activating a final switch 168 which causes the counter to stop counting and provide yet a second reading as to the volume of oil transferred.

The four-way valve 104 is then activated to reverse the flow of oil and the oil is then delivered through tube 150 into the valve 104 and upwardly through tube 170 and into end 110 of now the right-hand tube 108. The ball is then delivered through the switching relationship to the original position. In this manner, the amount of oil being metered can be accurately determined. Valves 112 and 114 are used for removing all air and gas from the prover before a proving can be done. As priorly stated, this is conventional operation for a prover barrel and is well known to one skilled in the art.

The details of the fifth wheel male assembly are shown in FIGS. 2 and 9. The fifth wheel male assembly 160 is mounted in the following manner to tubes 120 and 122 of the upper section 50. Four struts (two rear struts 200 and two front struts 202) extend upwardly from a rectangular base plate 210 to the connection points on tubes 120 and 122. The struts 200 and 202 are welded to the base plate 210 along edges 212. The forward struts 202, as shown in FIG. 4, are welded on at an angle to an angle iron 212. The angle iron is then bolted onto the circular connection flange 132 by means of bolt 214. At this connection, the angle iron 212 is perpendicular to tube 122 so that the forward strut 202 extends downwardly at an angle as best shown in FIG. 4. The rear strut 200 also extends upwardly at an angle as shown in FIG. 4 and is welded onto the bottom portion 216 of a holding strap 218. The holding strap 218 includes the upper section 220 and the lower section 216 which, when bolted together by means of bolts 222, releasably encircle tubes 120 or 122. By tightening down bolts 222, the holding strap 218 can firmly engage the tube. It is readily seen, that the fifth wheel assembly 160 can be rapidly removed by releasing the bolts 222 thereby releasing the rear strut 200 and releasing bolt 212 thereby releasing the forward strut 202.

The struts 200 and 202 are further supported to the base plate by welding side plates 220 to the struts along seam 223 and to the base plate 210 along seams 224.

In FIG. 9, is shown centrally disposed in the base plate 210 a downwardly extending male fifth wheel connection point 900. It is to be understood that such a connection point is conventional in the art and can be either bolted or welded onto base plate 210.

The details of the leveling jack 70 are shown in FIG. 3 to include a ground plate 300 which is substantially rectangular in shape having opposing angled edges 302. Upwardly extending from the rectangular ground plate 300 is a hollow tube 304 having formed therein a plurality of holes 305. The hollow tube 304 extends upwardly into an outer hollow tube 306 having an interior diameter substantially equal to the outside diameter of tube 304. In turn, the hollow tube 306 is positioned on the inside of tube 308. Tube 308 contains a worm gear arrangement that functions in a conventional manner to move surface 306 upwardly and downwardly in tube 308 by the crank action of handle 310.

In operation, when the portable prover barrel apparatus 10 of the present invention is located on site, it can be unhooked from the vehicle by first dropping the bottom tube 304 by removal of pin 312, letting the bottom plate 300 abut against the ground, then reinserting pins 312 through tube 306 and into one of the holes 305. The entire upper section 50 can then be lifted upwardly by means of hand-crank 310 which causes the cylinder 306 to move downwardly (assuming, of course, that the fifth wheel is disconnected).

The jack 70 is primarily supported by welding the outer cylinder 308 to a rectangular plate 314 which in turn is welded to angle iron 316. The angle iron 316 is bolted by means of bolts 318 through the circular connecting flanges 126 and 118. Additional support is provided by welding a rod 320 to the cylinder 308 as shown in FIG. 3 and welding the other end of the rod 320 to a second angle iron 322 which in turn is bolted by means of a bolt 318 through the circular flange 126 and 118. In this fashion, while the portable prover barrel apparatus 10 of the present invention is interconnected with a moving vehicle, the plate 300 substantially abuts the bottom of cylinder 306 being substantially lifted above the ground.

In FIG. 4, a side view representation of the portable prover barrel apparatus 10 of the present invention is shown. It is noted that the leveling jacks 70 are oriented on the apparatus 10 in such a manner as to be substantially perpendicular to tubes 122 and 108. Furthermore, it is to be noted that a temperature gauge 400 is provided off of tube 170. The temperature sensor in gauge 400 is conventionally attached to tube 170 to provide, for example, a thermal couple element on the interior of the oil flowing within the tube. Under the teachings of this invention, the temperature gauge 400 is arranged to be disposed on the interior of the housing compartment 80. Inlet and outlet pressure gauges 401 are also mounted in housing 80. Furthermore, the tube 170 is positioned so that it abuts the rear wall 402 of the housing 80.

Also shown in FIG. 4 is a valve handle 410 which engages the four-way valve 104 to activate the flow of the oil through the prover barrel as previously discussed. Once again, due to the unique design of the portable prover barrel apparatus 10 of the present invention, the housing 80 is positioned over the top of the valve 104 so that the valve handle 410 is disposed on the interior of the housing 80 near the rear wall 402.

The details of the wheel assembly 40 are shown in FIGS. 5 and 6. The wheel assembly 40 includes a pair of tandem wheels 500 each set of tandem wheels being located on opposing ends of the axle 502. The axle 502, as shown in FIG. 1, extends the entire width of the portable apparatus 10 of the present invention.

The wheel assembly 40 is mounted to the lower section 30 in the following manner. A rectangular shaped channel 504 is welded onto a square bar 506. There are two square bars 506, as shown in FIG. 1, which extend across the lower section 30 above the axle 502. The bars 506 being welded to the channels 504 form a rectangular frame assembly that receive tubes 106 and 108. Each channel 504 has mounted to it a conventional spring 510 which is conventionally connected 512 to the channel 504. In turn, the spring 512 is conventionally interconnected to the axle 502 by means of coupler 514. It is to be expressly understood that the connection of the spring to the channel 504 and the connection of the spring 510 to the axle 502 and wheel assembly 40 can be performed by a number of known techniques by one skilled in the art. In this manner, the springs 512 provide sufficient shock absorbing characteristics to provide relatively smooth travel of the prover barrel apparatus 10 of the present invention even over rough terrane. Furthermore, conventional fenders 513 are mounted to the edge of channel 504 as best shown in FIG. 1. The fender 513 can be attached by means of common welding techniques or the like. The tubes 106 and 108 are mounted into the channels 504 as shown in FIGS. 5 and 6. For illustration purposes, only the mounting of tube 108 is discussed. Tube 108 is positioned in the channel 504. The width of the channel is such that it substantially corresponds to the outer diameter of the tube 108. A hold-down strap 600 is provided which is formed from an arcuate metal band. The metal band 602 has welded at opposing ends thereof a threaded stud 604 which is passed through an angle iron portion 606 and a bar 608 extending underneath the channel 504 and extending from one side of the holding strap 600 to the other side beneath the channel 504. The threaded studs 604 are then bolted into place by means of nuts 610 thereby firmly abutting the bottom plate 608 against the bottom of the channel 504 and drawing the holding strap 600 downwardly firmly around the tube 108 so that the tube 108 is firmly engaged in the channel between the holding strap 600 and bar 608. As shown in FIG. 1, there are four such holding straps, two on each of the left and right tubes 106 and 108.

In conclusion, it is shown under the teachings of the present invention that the wheel assembly 40 is fixedly attached to tubes 106 and 108 of the lower section 30 of the portable prover barrel apparatus 10 of the present invention. Tie straps 60 serve to hold the tubes in elongated channels 504 which in turn are welded to crossbars 605. Leaf springs 510 then serve to interconnect the axle 502 and the wheels 500 to the channels 504. Holding straps 600 are necessary in order to positively engage tubes 106 and 108 since welding is not permitted under the American Petroleum Institute specifications on the tubes 106 and 108. In fact, no welding is permitted anywhere on the prover barrel tubes.

Figure 8:
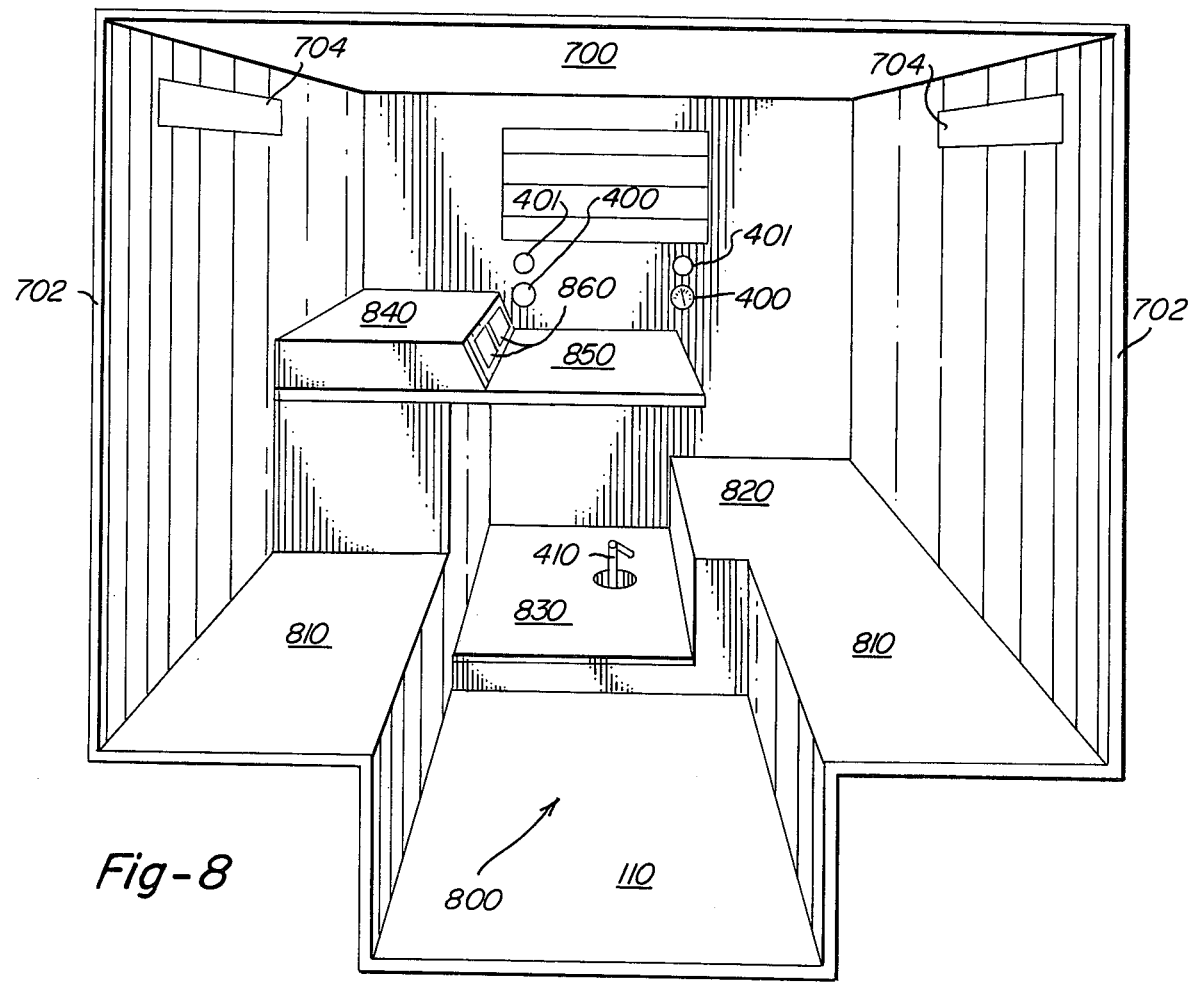
FIG. 8 is a perspective internal view of the housing of FIG. 7 showing the central instrumentation and control.

The details of the housing compartment 80 are shown in FIGS. 7 and 8. In FIG. 7 is shown the outside perspective view of the housing compartment 80 of the present invention mounted on tubes 106 and 108. The housing compartment 80 is substantially cubic in shape and includes a roof 700, sides 702 having windows 704, and ends 706. In the front end 706, is placed a door 708 for access into the interior of the housing compartment 80. Between tubes 106 and 108 is a downwardly extending longitudinal portion 110. The housing compartment 80 is constructed accordingly to conventional techniques and can be insulated to withstand the severity of winter or summer. The housing compartment is conventionally mounted to cross-bars 506, FIG. 1.

The interior of the housing compartment 80 is shown in FIG. 8 to include a walkway portion 800 which is formed from the lowered recess portion 110. Seats 810 disposed on opposing longitudinal sides of the recessed portion 110 and an operator's seat area 820. The recessed area 110 terminates in a raised platform 830 upon which the operator can place his feet while sitting. A console 840 with a forwardly extending desk portion 850 is constructed to enable the sitting operator to read electronic displays 860. In this position, the operator of the prover barrel of the present invention has ready access to the control handle 410 for the four-way valve 104, and can read the temperature on gauge 400. Furthermore, the observer for the buyer and the observer for the seller can sit in areas 810 and observe the measuring of the meter.

Although the present invention has been described with a certain degree of particularity, it is understood that the present disclosure has been made by way of example and that changes in details of structure may be made without departing from the spirit thereof.

I claim:

1. A portable prover barrel apparatus, said apparatus comprising:
   a lower section with left and right tubes, each of the aforesaid tubes being horizontal and parallel to each other and terminating in a vertical upstanding tubular rear end and in a vertical upstanding tubular connector at the front end, a wheel assembly connected to said lower section, said wheel assembly comprising:
  (a) an axle,
  (b) wheels operatively connected to opposing ends of said axle, and
  (c) means engaging the mid-section region of said left and right lower section tubes for mounting said lower section to said axle, an upper section with left and right tubes, each of the aforesaid tubes being horizontal and parallel to each other and terminating, at the rearward end, in a downwardly extending vertical tubular connector, a U-shaped tubular portion operatively interconnected with the forward ends of said upper section left and right tubes, said upper section and said U-shaped tubular portion being positioned above and parallel to said lower section left and right tubes, a fifth wheel male assembly mounted to said upper section left and right tubes near said U-shaped portion, and means for connecting said lower's upstanding connector to said upper section's downwardly extending connector.

2. The apparatus of claim 1 further comprising means coupled to said connecting means for leveling said apparatus.

3. The apparatus of claim 1 further comprising:
a housing compartment, and
means for mounting said housing compartment above said lower section left and right tubes, said compartment being located directly behind said upper section.

4. The apparatus of claim 3 in which said housing compartment further comprises a door or the front wall of said compartment, said door being oriented above and between said lower section's left and right tubes.

5. The apparatus of claim 3 in which said housing compartment comprising:
  means located in the interior of said compartment operatively interconnected with said prover barrel for controlling the flow of oil through said lower section's left and right tubes,
  means located in the interior of said compartment operatively interconnected with said prover barrel for determining the temperature of said oil, and
  means located in the interior of said compartment operatively interconnected with said prover barrel for determining the flow of said oil through said upper and lower sections.

6. A portable prover barrel apparatus, said apparatus comprising:
  a lower section with left and right tubes, each of the aforesaid tubes being horizontal and parallel to each other and terminating in a vertical upstanding tubular rear end and in a vertical upstanding tubular connector at the front end,
  a wheel assembly connected to said lower section, said wheel assembly comprising:
    (a) an axle,
    (b) wheels operatively connected to opposing ends of said axle, and
    (c) means engaging the mid-section region of said left and right lower section tubes for mounting said lower section to said axle,
  an upper section with left and right tubes, each of the aforesaid tubes being horizontal and parallel to each other and terminating, at the rearward end, in a downwardly extending vertical tubular connector,
  a U-shaped tubular portion operatively interconnected with the forward ends of said upper section left and right tubes, said upper section and said U-shaped tubular portion being positioned above and parallel to said lower section left and right tubes,
  a fifth wheel male assembly mounted to said upper section left and right tubes near said U-shaped portion,
  means for connecting said lower section's upstanding connector to said upper section's downwardly extending connector,
  means coupled to said connecting means for leveling said apparatus,
  a housing compartment, and
  means for mounting said housing compartment above said lower section's left and right tubes.

7. The apparatus of claim 6 in which said housing compartment comprises:
  means located in the interior of said compartment operatively interconnected with said prover barrel for controlling the flow of oil through said lower section's left and right tubes,
  means located in the interior of said compartment operatively interconnected with said prover barrel for determining the temperature of said oil,
  means located in the interior of said compartment operatively interconnected with said prover barrel for determining the flow of said oil through said upper and lower sections, and
  means located in the interior of said compartment operatively interconnected with said prover barrel for determining the inlet and outlet pressure.

8. The apparatus of claim 6 in which said housing compartment further comprises a door on the front wall of said compartment, said door being oriented above and between said lower section's left and right tubes.

9. A portable prover barrel apparatus selectively coupled to a vehicle, said apparatus comprising:
  a lower section with left and right tubes, each of the aforesaid tubes being horizontal and parallel to each other and terminating in a vertical upstanding tubular rear end and in a vertical upstanding tubular connector at the front end,
  an upper section with left and right tubes, each of the aforesaid tubes being horizontal and parallel to each other and terminating, at the rearward end, in a downwardly extending vertical tubular connector,
  a U-shaped tubular portion operatively interconnected with the forward ends of said upper section left and right tubes, said upper section and said U-shaped tubular portion being positioned above and parallel to said lower section left and right tubes,
  means for connecting said lower section's upstanding connector to said upper section's downwardly extending connector,
  at least two wheels engaging said lower section for connecting said wheels to said lower section, and
  means for selectively coupling said upper section to said vehicle.

10. The prover barrel apparatus further comprising:
a housing compartment mounted on said lower section behind said upper section.

* * * * *